(12) United States Patent
Lauzier et al.

(10) Patent No.: US 7,079,743 B2
(45) Date of Patent: Jul. 18, 2006

(54) APPARATUS AND METHODS FOR ESTIMATING OPTICAL INSERTION LOSS

(75) Inventors: Louis Lauzier, Hickory, NC (US); Joel C. Rosson, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 10/964,407

(22) Filed: Oct. 13, 2004

(65) Prior Publication Data

US 2006/0078264 A1    Apr. 13, 2006

(51) Int. Cl.
*G02B 6/00* (2006.01)

(52) U.S. Cl. .................................... 385/134; 356/73.1

(58) Field of Classification Search ................ 356/73.1
See application file for complete search history.

(56) References Cited

U.S. PATENT DOCUMENTS

| | | | | |
|---|---|---|---|---|
| 5,179,419 A | * | 1/1993 | Palmquist et al. | 356/73.1 |
| 5,671,049 A | * | 9/1997 | Csipkes et al. | 356/496 |
| 5,862,250 A | * | 1/1999 | Csipkes et al. | 382/141 |
| 6,636,298 B1 | * | 10/2003 | Bachelder et al. | 356/73.1 |
| 6,941,016 B1 | * | 9/2005 | Wagman et al. | 382/199 |

OTHER PUBLICATIONS

International Electrotechnical Commission "Fiber Optic Interconnecting Devices and Passive Components", May 14, 2002.
Data-Pixel SAS, "Interferometric Measurement of Fiber Optic Parameters", Jan. 10, 2003.
Data-Pixel, "Digital Automated Interferometer for Surface Inspection", admitted art.
Data-Pixel, "Koncentrik Interferometer", admitted art.
Data-Pixel, Koncentrik data sheets downloaded from Data-Pixel website Aug. 27, 2004.
"Daisi Gives the Answer for Ferrule Measurement", downloaded from QA-talk website on Aug. 27, 2004.
Data-Pixel, DAISI data sheet downloaded from Data-Pixel website Aug. 27, 2004.

* cited by examiner

*Primary Examiner*—Sung Pak
(74) *Attorney, Agent, or Firm*—Michael E. Carroll, Jr.

(57) ABSTRACT

An apparatus and a method for estimating optical insertion loss of a fiber optic jumper cable are disclosed. Estimation of the insertion loss is accomplished without physically contacting an optical connection portion of the ferrule end face of the connector. In one embodiment, the apparatus and method use pattern matching to compare an optical fiber core of a reference jumper cable with an optical fiber core of a jumper cable being tested. Then, the relative signals for each pattern are compared and used for estimating the optical insertion loss using an appropriate algorithm. Additionally, the apparatus and method may include other inspection techniques such as surface and/or geometry inspection.

26 Claims, 5 Drawing Sheets

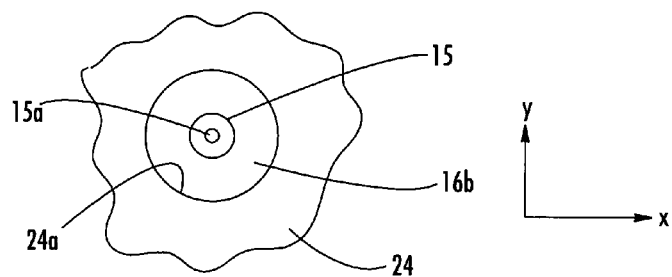
FIG. 2a
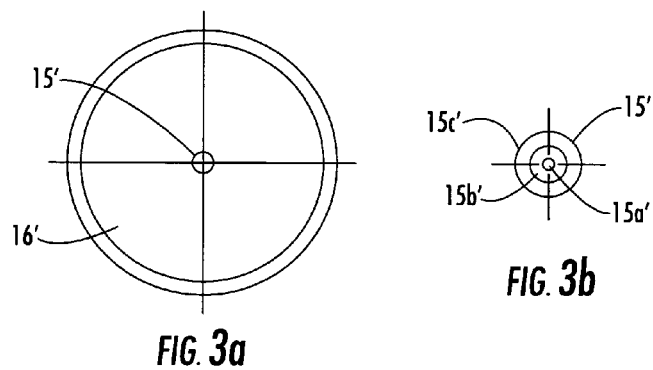
FIG. 3a
FIG. 3b
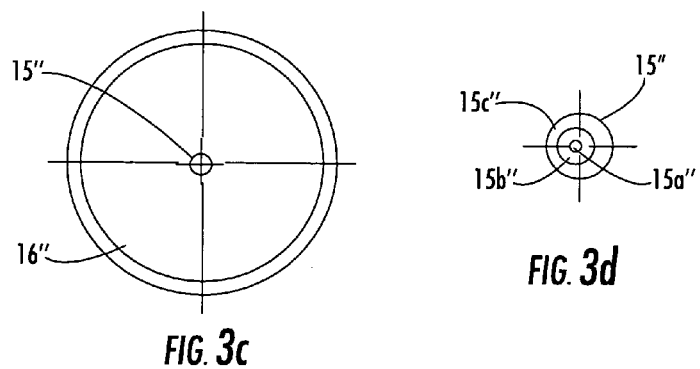
FIG. 3c
FIG. 3d

APPARATUS AND METHODS FOR ESTIMATING OPTICAL INSERTION LOSS

FIELD OF THE INVENTION

The present invention relates generally to an apparatus and method for accurately estimating, among other features, the optical insertion loss for an optical fiber jumper cable without physically contacting the optical connection portion of a ferrule end face.

BACKGROUND OF THE INVENTION

Optical waveguides are used for transporting a variety of signals such as voice, video, data transmission, and the like along an optical communication network. The optical communication network has power losses that must be budgeted for when designing the network. By way of example, power losses include losses in the optical waveguide and insertion losses from connectivity points such as optical fiber jumper cables. A system designer must be concerned with these power losses when designing an optical network because the transmitting/receiving equipment must have a signal with enough power to overcome the power losses and maintain signal recognition.

In the optical communication industry it is desirable to test the performance of optical fiber jumper cables for parameters such as an optical insertion loss so the power loss is known. Typically, the optical performance of each optical fiber jumper cable (hereinafter jumper cable) is tested before the leaving the factory. Thus, the optical power losses due to the jumper cable can be accounted for when designing the optical network.

With the increasing use of low-power optical transmitting/receiving devices, minimizing the insertion losses at connection points is becoming more important. To support these low-loss optical systems, the industry is developing low-loss components such as low-loss optical connectors. However, low-loss components must be tested to ensure that they meet the required low-loss specifications. For instance, high-performance connectors on jumper cables should have a mated pair insertion loss under 0.1 dB.

Conventional testing of jumper cables requires physically mating the connector ferrules of the jumper cable being tested with a low-loss reference jumper cable and an optical power meter. For instance as shown in FIG. 1a, a benchmark insertion loss measurement of a reference jumper cable 10 is made by connecting the same across the optical power meter 5 to determine the insertion loss of reference jumper cable 10. Thereafter, an end 10a of reference jumper cable 10 is disconnected from an input connection 5a of optical power meter 5. Then as shown in FIG. 1b, a first optical connector (not visible) on first end 14a of a jumper cable 14 being tested is mated with an optical connector of reference jumper cable 10 disconnected from input connector 5a of optical power meter 5. A second optical connector (not visible) on second end 14b of jumper cable 14 being tested is connected to input connector 5a of optical power meter 5 and the optical power loss is measured. The difference between this measured insertion loss and the benchmark insertion loss is calculated, thereby yielding an insertion loss for jumper cable 14. In other words, the insertion loss measured for reference jumper cable 10 is subtracted from the insertion loss of the connected reference and tested jumper cables 10,14 to calculate the insertion loss of jumper cable 14.

This method of measuring the insertion loss of a jumper cable has several disadvantages. First, the conventional apparatus and method is a contact process. Stated another way, the optical connection portion of the connector ferrule of the jumper cable being tested must contact the respective surface of the reference jumper cable. This contact process can have the drawbacks of leaving permanent marks on the polished ferrule/optical fiber end face of the connector (hereinafter ferrule end face), transferring contaminant to the ferrule end face, and/or relatively large measurement variability.

Leaving permanent marks on the ferrule end face is undesirable because end users generally find permanent marks unacceptable when they are numerous, large, and/or close to the optical fiber. Transferring contaminants can cause erroneous readings and requires cleaning of the equipment and ferrules then taking another measurement, which is time-consuming and inconvenient. The measurement variability of the conventional testing method is relatively large compared with the limitation of 0.1 dB insertion loss for high-performance jumper cables. Thus, high-performance jumper cables that meet the 0.1 dB insertion loss specification may be wrongly accepted or unnecessarily rejected because of measurement variability. Furthermore, the connecting and disconnecting of the reference jumper cable during the contact process eventually cause wear on the ferrule end faces and the reference jumper cable must be replaced. Replacing the reference jumper cable can bias the measurement process in an unpredictable manner, plus maintaining and replacing the same is time-consuming and expensive.

BRIEF DESCRIPTION OF THE FIGURES

FIG. 2a is an end view of a portion of the apparatus of FIG. 2 depicting a connector ferrule disposed in the mating portion.

FIGS. 3a–3d are end views of connector ferrules and optical fibers for a reference jumper cable and a jumper cable for testing showing typical positions of the ferrule bore and optical fiber core.

DETAILED DESCRIPTION OF THE INVENTION

Figure 1A:
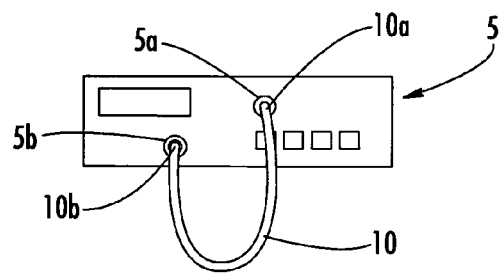
FIGS. 1a and 1b are schematic representations of the prior art method of measuring optical insertion loss for an optical fiber jumper cable.
Figure 1B:
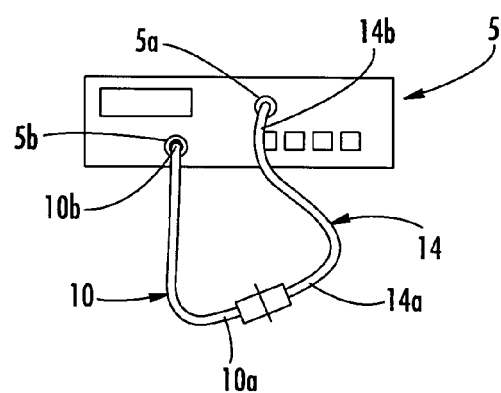
Figure 2:
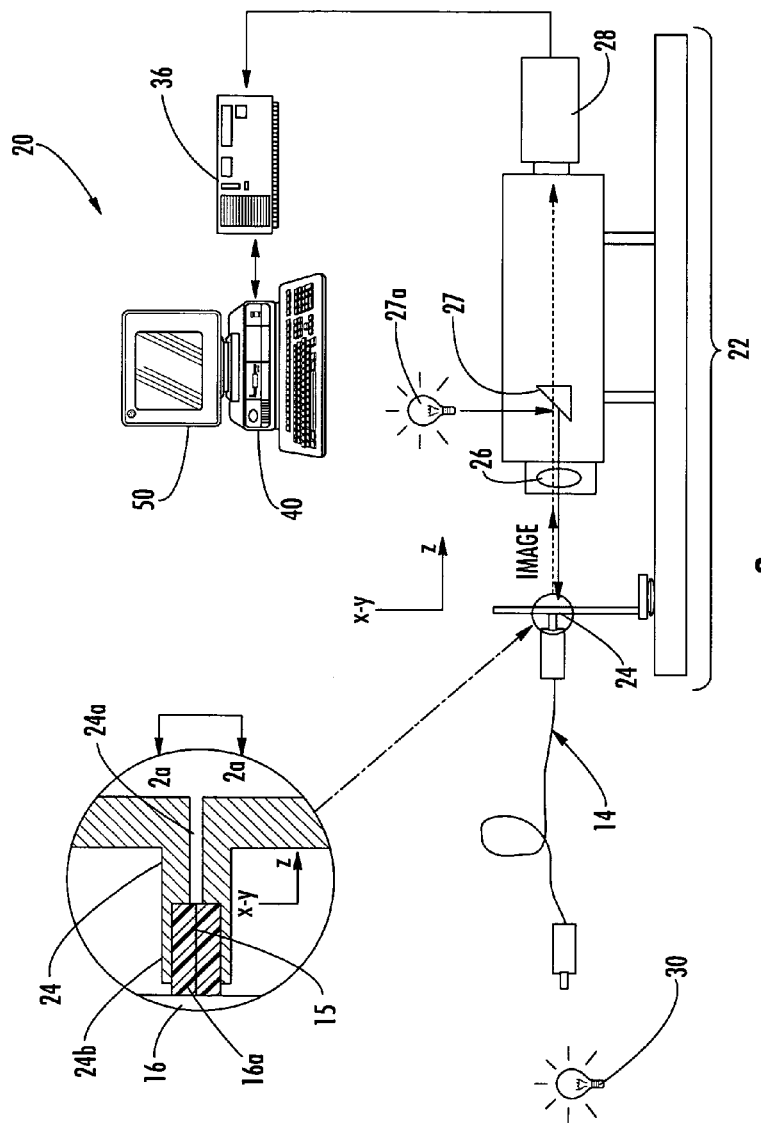
FIG. 2 is a schematic representation of an apparatus for estimating the optical insertion loss for an optical fiber jumper cable according to the present invention.

Illustrated in FIG. 2 is a schematic representation of an apparatus 20 for estimating the optical insertion loss for an optical connector of an optical fiber jumper cable. Apparatus 20 is advantageous over the prior art because, among other things, it can accurately estimate the insertion loss without physically contacting an optical connection portion of the ferrule end face of the connector. As used herein, the optical connection portion (OCP) is an end face portion of the connector ferrule that extends radially for about 50 microns or more past the circumference of a bore that holds an optical fiber disposed in the connector ferrule. Thus, the present invention overcomes the disadvantages of conventional contact insertion loss testing methods such as leaving permanent marks on the ferrule end face, transferring contaminants to the ferrule end face, and relatively large measurement variability. Moreover, since the measurement variability of the present invention is relatively small the present invention is suitable for testing of high-performance jumper cables.

The present invention uses pattern matching to estimate insertion loss. Specifically, the pattern matching occurs between a jumper cable being tested and a reference jumper cable to estimate the insertion loss of the connector of the jumper cable being tested. More specifically, data is obtained on the position of a core of an optical fiber disposed within a high-precision reference optical connector and is used as a benchmark for comparison with the position of a core of an optical fiber in the connector being tested. The positions of the respective cores of the optical fibers are found by injecting light into a free end of the respective jumper cables and viewing the ferrule end face of the connector disposed within the apparatus. An algorithm that is a function of a difference in positions of the respective optical fiber cores is then used to accurately estimate the insertion loss. Additionally, apparatus 20 may use other methods for accurately estimating insertion loss. For instance, the use of a reference jumper cable can be eliminated by viewing the position of the optical fiber core in at least two different orientations. In other words, a first view of the optical fiber core is mapped against at least one other view of the optical fiber core that is rotated at a predetermined angle such as 180 degrees.

Apparatus 20 may also optionally perform other functions besides estimating insertion loss. Examples of other functions include surface and/or geometry inspection of the entire connector ferrule end-face. Additionally, inspection of the apex offset of the connector ferrule can be accomplished with the use of an inferometer as known in the art. As shown in FIG. 2, apparatus 20 includes an imaging assembly 22, a first light source 30, a frame grabber 36, a computing device 40, and a display 50. FIG. 2 also depicts a jumper cable 14 attached to apparatus 20 for testing. Jumper cable 14 includes an optical fiber 15 and at least one connector 16.

Imaging assembly 22 includes a mating portion 24, a lens 26, a beam splitter 27, and a second light source 27a, and a camera 28. Mating portion 24 is used for precisely controlling the position of a connector ferrule 16a of jumper cable 14 being tested in an X-Y plane relative to camera 28. Preferably, connector ferrules of respective jumper cables are positioned at the same reference point in the X-Y plane and this reference point is repeatable to within a radius of about 0.1 μm. Additionally, mating portion 24 also aids in positioning connector ferrule 16a in the same position along the Z-axis; however, the tolerance of the placement along the Z-axis may be greater than the tolerance in X-Y plane. By way of example, positioning of the connector ferrule within mating portion 24 along Z-axis preferably has a repeatable tolerance of about 0.4 microns or less. As shown in the detail of FIG. 2, mating portion 24 includes an aperture 24a that is generally positioned so it aligns with an optical connection portion 16b (FIG. 2a) of the connector ferrule being tested. In other words, mating portion 24 only contacts areas of an end face (not numbered) of connector ferrule 16 that are radially outward of the optical connection portion 16b of the ferrule 16a of connector 16 being tested. Thus, mating portion 24 does not physically contact optical connection portion 16b of the ferrule end face.

FIG. 2a shows an end view of mating portion 24 depicting a portion of the end face of connector ferrule 16a visible therethrough. Mating portion 24 also includes an integral sleeve portion 24b for positioning ferrule 16 relative to aperture 24a. As shown, when ferrule 16 is inserted into sleeve portion 24b, optical connection portion 16b of ferrule 16 is generally aligned with aperture 24a for viewing. Additionally, portions of the end face of ferrule 16a radially outward of optical connection portion 16b contact mating portion 24 for alignment along the Z-axis as depicted in FIG. 2. Consequently, optical fiber 15 including core 15a is visible for imaging along with optical connection portion 16b of ferrule 16. Additionally, mating portion 24 may mounted so that it is movable along the Z-axis for optimizing the image. Likewise, magnification lens 26 may be mounted so it is movable.

Figure 2B:
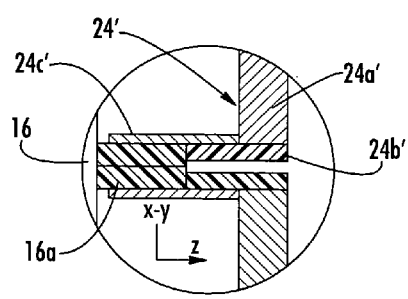
FIG. 2b is an enlarged view of an alternative configuration for a mating portion according to the present invention.

As shown, mating portion 24 is formed from a single material; however, the mating portion can have other configurations. By way of example, FIG. 2b shows a mating portion 24' that includes several components. Specifically, mating portion 24' includes a mating ferrule 24b' that is pressed into a plate 24a' and held with a friction fit. As shown, mating ferrule 24b' is used as a stop for ferrule 16 along the Z-axis. Mating ferrule 24b' can be any suitable material such as a glass-in-ceramic ferrule having a longitudinal bore therethrough for viewing. In order to align ferrule 16 in the X-Y plane an alignment sleeve 24c' is attached to mating ferrule 24b'. In other words, the sleeve is an alignment component, but other alignment portions or components are possible. As shown, a portion of alignment sleeve 24c' extends beyond mating ferrule 24b' for receiving a portion of ferrule 16. Thus, mating portion 24' accurately positions ferrule 16 in both the X-Y plane and along the Z-axis.

Imaging assembly 22 also includes lens 26 disposed between mating portion 24 and camera 28 for magnifying the image viewed by camera 28. By magnifying the image of optical connection portion 16b the details such as the position of the optical fiber core 15a can be determined with greater accuracy. Lens 26 and/or mating portion 24 should be positioned so that the image of optical connection portion 16b is in focus at camera 28. Camera 28 is used for capturing the image that is magnified by lens 26. Any suitable camera such as an analog or a digital camera may be used. In preferred embodiments, camera 28 is a charged coupled device (CCD) camera. For instance, camera 28 is a 2/3 CCD such as model KP-M1U available from Hitachi Denshi, Ltd. of Japan. However, any other suitable camera such as a CMOS camera could also be used.

Apparatus 20 may optionally also perform other functions besides estimating insertion loss. Examples include end face inspection of connector ferrule 16 for surface quality and/or inspection of the apex offset of connector ferrule 16. Inspection of the end face of the connector ferrule requires illuminating the same. As shown in FIG. 2, this can be accomplished by using a beam splitter 27 and a second light source 27a as portion of imaging assembly 22 for illuminating optical connection portion 16b. In this manner, light from second light source 27a is reflected by beam splitter 27 onto optical connection portion 16b while still allowing viewing of the magnified image by camera 28. Imaging assembly 22 can have other suitable configurations that ensure accurate positioning and imaging of the optical connection portion 16b other than depicted.

Camera 28 sends its video signal to frame grabber 36. Frame grabber 36 digitizes the video signal so that the data can be processed. Frame grabber 36 sends the digitized data to computing device 40 for processing. Computing device 40 selects and uses the correct algorithm for estimating an insertion loss for connector 16. The selection of the correct algorithm is based on the reference wavelength for which the insertion loss is being estimated and may be based on a value of a lateral offset LO. Thereafter, the estimate of the insertion loss can be viewed on display 50 along with any other optional information. For instance, display 50 can include other information such as the location of the optical fiber cores for the connectors, the lateral offset of the optical fiber cores, the optical fiber core spot intensity, and/or the optical fiber core area.

FIGS. 3a and 3b respectively depict end views of a ferrule 16' of a reference jumper cable having an optical fiber 15' therein and an enlarged view of optical fiber 15' showing a core 15a', a cladding 15b', and a coating 15c'. Typically, a reference jumper cable uses a high-precision ferrule 16' having a precision bore that is nearly concentric with the outer diameter. Likewise, the reference jumper cable typically has an optical fiber 15' having a high concentricity between core 15a', cladding 15b', and coating 15c'. In other words, the reference jumper cable has a relatively low insertion loss due to the relatively tight tolerances of the components; however, the reference jumper cable is relatively expensive and generally not used for ordinary applications.

Figure 3E:
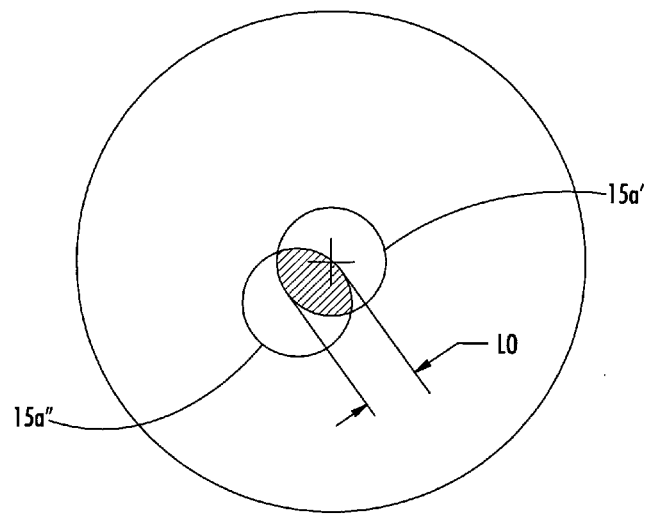
FIG. 3e shows an exploded superposition view of the overlapping optical fibers cores of the reference jumper cable and the jumper cable for testing of FIGS. 3a and 3c.

FIGS. 3c and 3d respectively depict end views of a typical ferrule 16" of a general use jumper cable being tested having an optical fiber 15" therein and an enlarged view of optical fiber 15" showing a core 15a', a cladding 15b', and a coating 15c'. As shown, ferrule 16" has a bore that is offset from the center of the ferrule. Likewise, optical fiber 15" has a core 15a" and a cladding 15b" that are offset from the center of optical fiber 15". The offsets of the ferrule bore and/or optical fiber result from normal manufacturing variability and/or tolerances. The deviation from the ideal geometry cause the majority of the insertion loss of the connector since these variances can cause misalignment of optical fiber cores in mating connectors. As shown in FIG. 3e, the present invention determines lateral offset LO between the optical fiber cores of the jumper cable being tested and the reference jumper cable by comparing their intensity patterns and their locations. Thereafter, the appropriate algorithm is selected and applied to accurately estimate the insertion loss of the connector.

Figure 4:
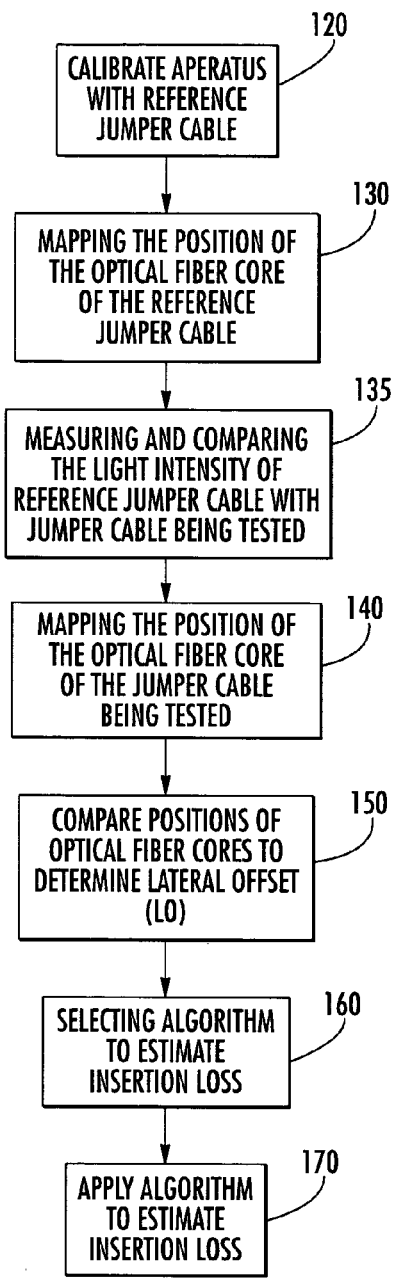
FIG. 4 is a flowchart depicting exemplary steps for estimating the insertion loss of a connector of an optical fiber jumper cable using the present invention.

FIG. 4 is a flowchart depicting exemplary process steps for estimating the insertion loss according to the present invention. A first step 120 is calibrating apparatus 20. First, a pixels per micron calibration determines the magnification factor viewed by the camera. This is accomplished by projecting a known dimension onto the camera and counting the pixels across the known dimension and computing the number of pixels per micron. After the magnification is determined, the first ferrule of the reference jumper cable is connected to mating portion 24a of apparatus 20 and the second ferrule is aligned with first light source 30 for injecting light into its optical fiber. First light source 30 illuminates the optical fiber core and this image is magnified by lens 26, which is viewed by camera 28 and the video signal thereof is sent to frame grabber 36. Thereafter, parameters such as gain, contrast, and brightness are adjusted to suitable levels for frame grabber 36. Generally speaking, an intensity of the light source viewed through the optical fiber core of the reference jumper cable is adjusted and used as a go/no-go test for jumper cable being tested. In other words, if the light intensity of the jumper cable being tested is not within a predetermined value of the reference light intensity there is a problem such as microbending or particles that is investigated.

Next, a step 130 of mapping the position of the optical fiber core of the reference jumper cable is performed so that the center point of the optical fiber core can be determined. The center point of the optical fiber core of the reference jumper cable is used as a benchmark position to determine lateral offset LO for the jumper cable being tested. Thus, the center point of the optical fiber core along with the image pattern is saved for comparison purposes. The image mapping may use pattern location and subpixel interpolation via contrast variation analysis. Thereafter, the reference jumper cable is then removed from apparatus 20.

Then, the first ferrule of the jumper cable being tested is connected to mating portion 24a of apparatus 20 and the second ferrule is aligned with first light source 30 for injecting light into the optical fiber. A step 135 of measuring and comparing the light intensity of the optical fiber core is performed. Specifically, the light intensity of the jumper cable being tested is compared with the light intensity of the reference optical fiber core. If the light intensity is below a predetermined value the apparatus and jumper cable are examined for problems. Additionally, the light intensity data can be useful for functions such as subpixel interpolation by comparing the variation of light intensities.

Next, a step 140 of mapping the position of the optical fiber core of the jumper cable being tested is performed. Step 140 of mapping the center point of the optical fiber core of the jumper cable is similar to the mapping of the center point of the optical fiber core of the reference jumper cable. Next, the video signal from camera 28 is sent to frame grabber 36, which digitizes the image for processing by computing device 40 so that the center point of the optical fiber core can be determined. Afterwards, a step 150 compares the position of the center point of the optical fiber core of the jumper cable being tested with the position of the center point of the reference jumper cable that was saved. Specifically, the difference between the two center points is calculated in nanometers, thereby yielding a lateral offset LO.

Subsequently, a step 160 of selecting the appropriate algorithm to estimate insertion loss is performed. Selection of the appropriate algorithm is based on the wavelength of the insertion loss being estimated and the value of the lateral offset LO. The various algorithms were determined by fitting equations to empirical data generated from testing of optical jumper cables. By way of example, if lateral offset is 3.15 micrometers or less at a reference wavelength of 1310 nanometers the insertion loss (dB) is estimated by equation (1).

$$\text{InsertionLoss}(dB) = 0.00721(LO)^4 + 0.0271(LO)^3 + 0.0792(LO)^2 + 0.101(LO) \tag{1}$$

If the lateral offset is greater than 3.15 micrometers at a reference wavelength of 1310 nanometers the insertion loss (dB) is estimated by equation (2).

$$\text{InsertionLoss}(dB) = 0.0060(LO)^4 + 0.0226(LO)^3 + 0.0660(LO)^2 + 0.084(LO) \tag{2}$$

Once the appropriate algorithm is selected, a step 170 of applying the lateral offset to the algorithm is performed, thereby yielding an estimated value for the insertion loss of optical connector of the jumper cable being tested. Thereafter, the estimate of insertion loss and/or other information may be sent to display 50 for viewing the results. Likewise, the information on the optical performance of the jumper cable can be stored and/or manipulated by computing device 40.

Besides being a non-contact process, the present invention is also advantageous because it results in a lower measurement variability compared with the traditional contact method. For the equations given above, the precision of the insertion loss estimate at 3σ was 0.027 dB. Thus, the present invention is suitable for testing high-performance jumper cables. Of course, algorithms for other reference wavelengths such as 1550 nanometers can be determined and used with the concepts of the present invention.

Many modifications and other embodiments of the present invention, within the scope of the appended claims, will become apparent to a skilled artisan. For example, the imaging assembly can have other configurations that may be suited for automated work station. Additionally, the concepts of the present invention are suitable for different types and sizes of ferrules such as SC or LC ferrules. Therefore, it is to be understood that the invention is not to be limited to the specific embodiments disclosed and that modifications and other embodiments may be made within the scope of the appended claims. Although specific terms are employed herein, they are used in a generic and descriptive sense only and not for purposes of limitation. The invention has been described with reference to optical fiber jumper cables, but the inventive concepts of the present invention are applicable to other suitable optical assemblies as well.

The invention claimed is:

1. An apparatus for estimating an optical insertion loss of a fiber optic jumper cables comprising:
   an imaging assembly, the imaging assembly comprising:
      a mating portion, wherein the mating portion is used for positioning a first ferrule of the fiber optic jumper cable and includes a longitudinal bore therethrough so that the mating portion does not physically contact the optical connection portion of a first ferrule end face of the fiber optic jumper cable during testing, wherein the longitudinal bore of the mating portion has a diameter of about 1 millimeter, thereby allowing imaging of the optical connection portion;
      a lens, the lens for magnifying the image of the optical connection portion of the first ferrule end face of the fiber optic jumper cable; and
      a camera, the camera being used for imaging the optical connection portion of the first ferrule end face and outputting a signal;
   a frame grabber, the frame grabber being used for digitizing the signal from the camera;
   a computing device, the computing device receives the signal from the frame grabber and calculates an estimate of the optical insertion loss for the fiber optic jumper cable.

2. The apparatus of claim 1, further comprising a display for viewing data.

3. The apparatus of claim 1, the camera being selected from the group of a charged coupled device (CCD) camera and a CMOS camera.

4. The apparatus of claim 1, the mating portion including a mating ferrule having the longitudinal bore therethrough and an alignment sleeve that attaches to the mating ferrule for receiving the first ferrule of the fiber optic jumper cable.

5. The apparatus of claim 1, the mating portion aligning the first ferrule in an X-Y plane, the alignment of the mating portion in the X-Y plane having a repeatability tolerance of about 0.1 micron so that a lateral offset can be precisely determined.

6. The apparatus of claim 1, further including at least one alignment component attached to a mating ferrule of the mating portion, wherein the alignment component is used for aligning and holding a portion of the fiber optic jumper cable with the mating ferrule.

7. The apparatus of claim 6, the at least one alignment component being a sleeve that fits over a portion of the mating ferrule.

8. The apparatus of claim 1, the mating portion being a portion of a plate that is movable for adjusting an image.

9. The apparatus of claim 1, further comprising a beam splitter for illuminating the optical connection portion, thereby allowing inspection.

10. The apparatus of claim 1, further comprising a light source for injecting a signal into the fiber optic jumper cable.

11. An apparatus for estimating an optical insertion loss of a fiber optic jumper cable comprising:
   an imaging assembly, the imaging assembly comprising:
      a mating ferrule, the mating ferrule being attached to a plate, the plate being movable to adjust an image of an optical connection portion, wherein the mating ferrule is used for positioning a ferrule of the fiber optic jumper cable, the mating ferrule having a bore therethrough so that the mating ferrule does not physically contact the optical connection portion of a ferrule end face of the fiber optic jumper cable during testing and the bore having a diameter of about 1 millimeter or less thereby allowing imaging of the optical connection portion;
      at least one alignment component attached to the mating ferrule, wherein the alignment component is used for aligning a portion of the fiber optic jumper cable with the mating ferrule; and
      a camera, the camera being used for imaging at least a portion of the optical connection portion of a connector and outputting a signal;
   a frame grabber, the frame grabber being used for digitizing the signal from the camera;
   a computing device, the computing device receives the signal from the frame grabber and calculates an estimate of the optical insertion loss of the fiber optic jumper cable; and
   a display for viewing the estimated optical insertion loss.

12. The apparatus of claim 11, further including a lens for magnifying the image of a ferrule end face of the fiber optic jumper cable.

13. The apparatus of claim 11, the at least one alignment component being a sleeve, the sleeve aiding in aligning the mating ferrule with a ferrule end face of the fiber optic jumper cable.

14. The apparatus of claim 11, further comprising a light source for injecting a signal into the fiber optic jumper cable.

15. The apparatus of claim 11, the camera being selected from the group of a charged coupled device (CCD) camera and a CMOS camera.

16. A method for estimating an optical insertion loss of a fiber optic jumper cable comprising the steps of:
   calibrating an insertion loss apparatus using a reference jumper cable;
   mapping a position of an optical fiber core of the reference jumper cable;
   mapping a position of an optical fiber core of a jumper cable being tested;
   comparing the positions of the optical fiber cores of the reference jumper cable and the jumper cable being tested to determine a lateral offset;

selecting an algorithm for estimating the insertion loss; and applying the algorithm to estimate the insertion loss.

17. The method of claim 16, further comprising the step of illuminating the optical connection portion using a beam splitter.

18. The method of claim 16, the step of selecting an algorithm further including selecting the algorithm based on a reference wavelength.

19. The method of claim 16, further comprising the step of calibrating the apparatus using a reference jumper cable.

20. A method for estimating an optical insertion loss of a fiber optic jumper cable comprising the steps of:

providing a fiber optic jumper cable, the fiber optic jumper cable having a first connector and a second connector;

attaching the first connector of the fiber optic jumper cable to an imaging assembly, wherein an optical connection portion of a ferrule end face is free from physical contact;

injecting an optical signal into the second connector of the fiber optic jumper cable without contacting a ferrule end face of second connector, thereby propagating the optical signal along the fiber optic jumper cable so that the optical signal exits the first connector;

magnifying the optical signal received at the first connector;

viewing the magnified optical signal;

creating an output signal by mapping the magnified optical signal; and processing the output signal to estimate an optical insertion loss of the fiber optic jumper cable, wherein processing the output signal comprises comparing the output signal with a reference output signal of a reference jumper cable and computing a lateral offset between respective optical fiber cores.

21. The method of claim 20, further comprising the step of calibrating the apparatus using a reference jumper cable.

22. The method of claim 20, the step of viewing using a camera selected from the group of a charged coupled device (CCD) camera and a CMOS camera.

23. The method of claim 20, the step of processing the output signal using a computing device.

24. The method of claim 20, the step of processing the output signal using a frame grabber that digitizes and stores the output signal.

25. The method of claim 20, further comprising saving the output signal and removing the first connector from the imaging assembly and then rotating the first connector through a predetermined angle and reattaching the first connector to the imaging assembly and creating a second output signal for comparison with the output signal to estimate the insertion loss of the fiber optic cable jumper.

26. The method of claim 20, the step of processing further comprising selecting one of a plurality of algorithms for estimating the insertion loss.

* * * * *